United States Patent [19]

Hubrecht et al.

[11] 4,241,816
[45] Dec. 30, 1980

[54] SELF-LOCKING SHOCK ABSORBER WITH VOLUME COMPENSATION

[75] Inventors: Gerard Hubrecht, Strasbourg; Gerard Mechain, Schiltigheim, both of France

[73] Assignee: Quiri, Schiltigheim, France

[21] Appl. No.: 956,747

[22] Filed: Nov. 1, 1978

[30] Foreign Application Priority Data

Nov. 10, 1977 [FR] France .................. 77 34956

[51] Int. Cl.³ .................. F16F 9/06; F16F 9/50; F16L 55/04
[52] U.S. Cl. .................. 188/298; 188/314; 188/317
[58] Field of Search .............. 188/314, 298, 317, 282, 188/129, 134, 269

[56] References Cited

U.S. PATENT DOCUMENTS

| 3,536,312 | 10/1970 | Löhr | 188/314 X |
| 3,837,444 | 9/1974 | Allinquant et al. | 188/298 X |

Primary Examiner—Douglas C. Butler
Attorney, Agent, or Firm—Prutzman, Kalb, Chilton & Alix

[57] ABSTRACT

An automatic-locking damping unit designed to prevent damage to pipelines exposed to violent shaking. The unit is characterized by the presence of a compensating chamber provided in the inner cavity of the cross-head; this chamber communicating with the inner space of the unit via two valves and nozzles. The invention is of interest to designers of hydraulic equipment.

9 Claims, 2 Drawing Figures

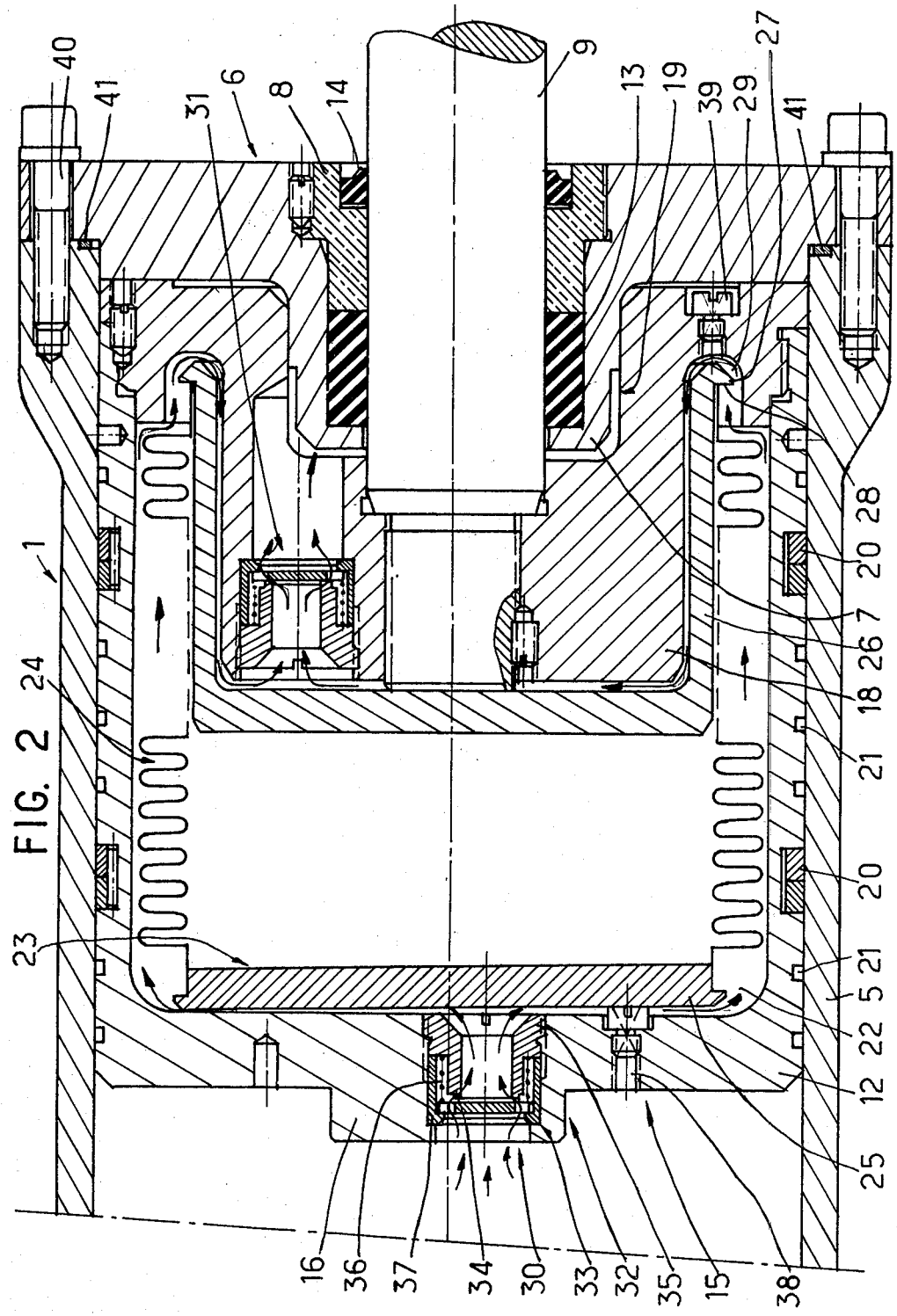

SELF-LOCKING SHOCK ABSORBER WITH VOLUME COMPENSATION

BACKGROUND OF THE INVENTION

1. Field of the Invention

The present invention relates to an automatic-locking damping or shock absorber unit principally designed to prevent damage to pipelines in thermonuclear power stations in the event of an earthquake.

2. Description of the Prior Art

Oil pressure damping units which are pivotably mounted, both on supports rigidly attached to a stationary wall and also on the pipe system or pipeline to be protected, are already available.

These damping units are internally equipped with a preregulated automatic locking device which exerts a sufficiently powerful locking action to prevent the pipes or pipeline from commencing to resonate. They produce a stationary point and prevent the breakage or damage caused by seismic shocks, by battering, by the violent shocks and blows resulting from the sudden release of safety valves or from pipeline breaks.

The automatic locking device only operates in the event of sudden movements and, since the damping or shock absorbing unit is equally well suited to withstand pulling forces as compression forces, it does not present any resistance to slow movements such as those resulting from expansion.

The sturdy nature of these units, their sensitivity and minimal response time render them capable of efficiently withstanding virtually any test.

These qualities must be retained in humid, chemically charged and radiation prone environments found in nuclear power stations.

The Applicant has been able to obviate the different disadvantages resulting from secondary effects such as pollution of the oil in contact with the atmosphere, cavitation phenomena and radiation resistance and also to compensate for volume variations resulting from expansion of the oil following an increase in temperature by means of a unit comprising metal diaphragms or capsules disposed in series.

SUMMARY OF THE INVENTION

The present invention is designed to substantially improve this art by providing an automatic-locking damping or shock absorbing unit wherein the system of locking parts and elements such as the valve, nozzle and sealed and pressurized bellows are located in the cross-head or piston head of the damping jack or shock absorber cylinder.

This design feature provides it with many qualities and advantages and ensures an improved performance.

Accordingly, for a given load, i.e., a nominal stress, the entire cross-section of the jack is used. The result over the conventional art is the following: operating pressure reduced by a quarter, essentially fourfold increase in tightness, weight reduction.

The following are additional results: greater durability-since the operating pressure is reduced, wear of the elements is reduced; improved performance vis-a-vis radiation by using metal joints to replace elastomer joints and by using a metal compensation seal; no risk of pollution from the atmosphere—the pressurized unit has no contact with the atmosphere; unitary design: no welds—mechanically very reliable.

Aside from its structure the oil volume to be thermally compensated is smaller: less dead space. The presence of an inner pressure helps cram the valves during locking and substantially improves the response time.

Leaks are reduced as a result of the low operating pressure and the use of metal dynamic joints.

The following description is intended to provide a detailed account of all the technical features of the invention. It is provided by way of a non-limitative example only with reference to the accompanying drawings.

BRIEF DESCRIPTION OF THE DRAWINGS

FIG. 2 is an enlarged detailed longitudinal sectional view of the inside of the cross-head or piston head.

DESCRIPTION OF THE PREFERRED EMBODIMENT

Figure 1:
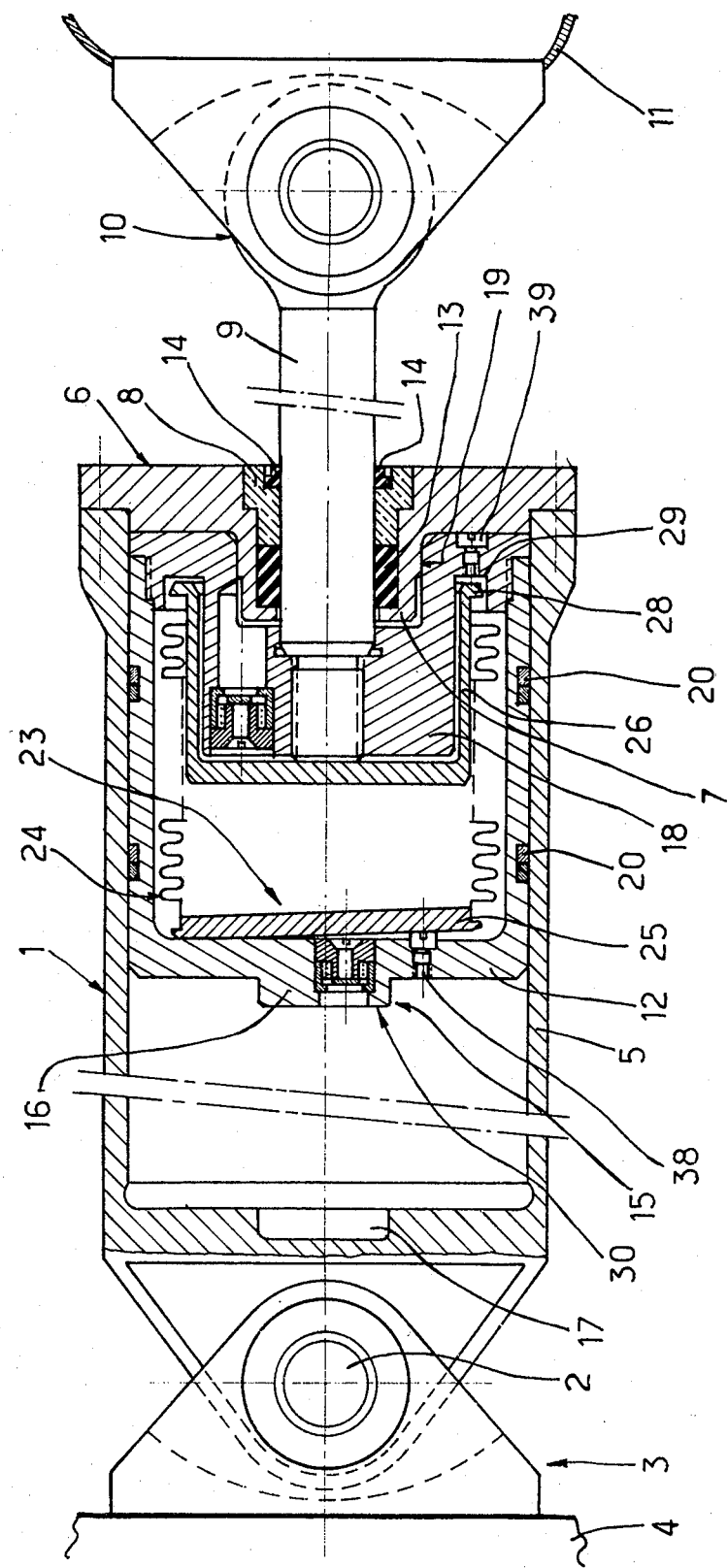
FIG. 1 is a partial longitudinal sectional view of the unit according to the invention. It provides a general view of the internal constitution of the device.

The damping unit according to the invention consists of a jack 1 rigidly attached at one of its ends to a joint 2 provided on a support such as 3 rigidly mounted on a base 4 which is stationary, such as a foundation, wall, etc.

The essentially cylindrical body 5 of the jack is sealed at one of its ends by a packing box element 6 comprising a central boss 7 receiving the guide ring 8 of the shaft 9 of the jack.

This latter comprises an end which is mechanically connected to a pivotable support 10 rigidly connected to a conduit, pipe or the like protected by a support collar 11.

The shaft 9, which is mechanically connected at its other end to a cross-head or piston head 12, extends through the body of the packing box element via the guide ring 8 and the inner sealing joint 13 and outer sealing joint 14.

The cross-head is essentially cylindrical with a front surface 15 comprising a central boss 16 which provides end of return stroke damping by engaging with minimal play in a recess 17 provided at the center of the base of the lower chamber of the jack.

The cross-head comprises an opposite face formed by a sealing and anchoring wall 18 having a recessed central part 19 engaging on the boss 7 of the body of the packing box 6 and thereby ensuring in a similar manner end of forward stroke damping by flow of oil during the engagement operation.

The lateral wall of the cross-head comprises two pairs of split rings or metal segments 20 which are offset by one half-turn such that each slot is diametrically opposite, the segments being held in position by a pin.

This mounting feature ensures minimal leakage.

Seal-tightness is further ensured by decompression grooves or recesses such as 21 which are provided on the lateral surface of the cross-head.

The walls of the cross-head define between them a hollow inner space 22 which serves as a compensating chamber and comprises an approximately U-shaped longitudinal section.

This chamber is internally provided with a deformable capsule 23 in the form of a bellows filled with a pressurized inert gas. It has an undulating lateral surface 24, a front wall 25 which is slightly inclined to avoid sticking as a result of an oil film between the two surfaces and a tubular rear wall 26 having a U-shaped longitudinal section. Its base serves as the base of the bellows and its arms form a sliding surface for the undulations.

At its ends the tubular surface comprises a contact surface 27, to which the end edges 28 of the bellows are welded, thereby producing total seal-tightness.

The rear part of the bellows opens into the space situated between the inner lateral wall of the cross-head and the outer lateral surface of the tubular part. The capsule lodges via its shaft end in a cavity 29, thereby enabling the compensation chamber to be drained by means of an orifice, hereinafter referred to as a jet.

The cross-head comprises two valves—a forward valve 30 provided inside the front surface near the front boss 16 and a rear valve 31 lodged in the rear part of the cross-head.

These are unitary plate valves, the body 32 of which comprises at its upper part 33, the valve seat 34. The threaded base 35 of the body 32 enables it to be mounted in the wall. Each valve also comprises a spring 36 for opening the same and a casing 37 acting as a stop and defining the course of the valve.

These valves are characterized by their minimal sensitivity to the viscosity of the liquid, thereby improving the response time. They are mounted in the manner of a spring: the casing is screwed into a threaded hole and immobilised by screwing the body of the valve in the threaded part.

In the event of rapid movements in either direction the valves close at a given rate, thereby ensuring powerful damping.

Held open by their springs they allow the free displacement of the cross-head during slow movements, more specifically, during slight movements resulting from thermal expansion of the pipes.

To ensure continued displacement of the cross-head inside the cylinder after closing of one of the valves following a jolt, the cylinder is provided, other than in the case of special applications, with nozzles such as 38 and 39 which have a fixed flow rate and which are provided in its leading front part and through its rear face in the extension of the tubular structure of the compensating chamber.

The nozzles also allow compensation of the variation in the oil volume as a result of the temperature variation when the valves are closed.

It will also be noted that the body of the packing box is mounted on the body of the jack by means of screws such as 40 and seal-tightness is ensured by a metal toroidal joint 41 which is insensitive to temperature and radiation.

The cross-head is surface-treated to enable high frequency displacement without gripping.

The general configuration of the unit is such as to permit easy purging and correct operation even when a small quantity of air is present.

Accordingly, the valves always operate correctly as the small pocket of air which might form accidentally cannot come into contact with the valve.

When the shaft is rapidly pushed in a given direction, rapid locking of the valve involved is ensured; this locking action is maintained by the application of force.

In the basic version, when nozzles are provided, the locking action is not absolute: there is a possibility of slight movement due to leakage across this nozzle.

The locking action remains constant until the movement is changed or until release occurs.

If the movement changes direction, the relevant valve opens and its corresponding element performs the same role.

During slow movements the two valves remain open. They are held in this manner by their respective springs. The oil flows freely from one chamber of the jack to the other across the cross-head and passing through the valves and nozzles.

Variations in volume resulting from movements of the shaft or an increase in temperature are absorbed by the compression or expansion of the metal capsule, the additional volume being communicated to the interior of the cross-head either by the valves or by means of the nozzles if the valves are closed.

The oil used is highly viscous which results in only small leaks at the metal seals on the cross-head and makes for rapid closing of the valves.

What is claimed is:

1. A self-locking shock absorber assembly for preventing damage to pipeline members and the like exposed to sudden movements by temporarily immobilizing such members relative to their rigid supports comprising a hydraulic cylinder defining a sealed hydraulic chamber, a piston-head mounted within said chamber for reciprocal movement therealong, a piston rod extending outwardly from said cylinder and operatively connected to the piston head for reciprocal movement therewith, said cylinder and said rod having means for connection to said members and said supports, said piston head being provided with an interior compensating chamber for forming a fluid communication between portions of the hydraulic chamber at opposite ends of said piston head, a deformable fluid-tight capsule positioned within said compensating chamber and together with said piston head defining the course of said fluid communication, and valve means carried by said piston head to control fluid flow between said hydraulic chamber portions and said compensating chamber, said valve means being adapted to automatically close in response to rapid fluid flow therethrough corresponding to a preselected sudden movement thereby automatically locking said piston head and rod against further movement within said piston chamber.

2. The assembly of claim 1 wherein the piston head includes a front wall having a boss and a rear wall having a recessed part, said hydraulic cylinder including a recess complimentary to and in confronting relationship with said boss and a rod mounting member complimentary to and in confronting relationship with said recessed part to provide end of stroke damping of said assembly.

3. The assembly of claim 1 wherein the lateral wall of the piston head is provided with at least two split ring segments rotationally misaligned relationship.

4. The assembly of claim 1 wherein said valve means includes first and second valves positioned at the front and rear walls, respectively, of said piston head to provide controlled fluid flow into and out of said compensating chamber.

5. The assembly of claim 1 including auxillary fluid control nozzles in said piston head providing fluid flow communication between said hydraulic chamber and said compensating chamber to allow auxiliary fluid flow therebetween upon closing of said valve means.

6. The assembly of claim 1 wherein said capsule is provided with an undulating lateral surface in the form of bellows and is filled with an inert gas.

7. The assembly of claim 1 wherein said valve means includes flow responsive valves biased toward a normally open position and closable in response to a preselected flow into said compensating chamber.

8. The assembly of claim 1 wherein the piston head includes a front wall having a boss with a passage therethrough and a rear wall having a recessed part with a conduit adjacent the recess, said valve means includes a first valve positioned in said passage and a second valve positioned in said conduit, said valves being closable in response to a preselected fluid flow into said compensating chamber.

9. The assembly of claim 8 wherein the deformable capsule telescopically engages said rear wall.

* * * * *